United States Patent
Liu et al.

(10) Patent No.: US 10,757,642 B2
(45) Date of Patent: Aug. 25, 2020

(54) INFORMATION TRANSMISSION METHOD, TERMINAL DEVICE, AND NETWORK DEVICE

(71) Applicant: HUAWEI TECHNOLOGIES CO., LTD., Shenzhen, Guangdong (CN)

(72) Inventors: Jianqin Liu, Beijing (CN); Bingyu Qu, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/272,129

(22) Filed: Feb. 11, 2019

(65) Prior Publication Data

US 2019/0174401 A1 Jun. 6, 2019

Related U.S. Application Data

(63) Continuation of application No. PCT/CN2017/096862, filed on Aug. 10, 2017.

(30) Foreign Application Priority Data

Aug. 12, 2016 (CN) .......................... 2016 1 0670036

(51) Int. Cl.
*H04L 12/28* (2006.01)
*H04W 48/16* (2009.01)
(Continued)

(52) U.S. Cl.
CPC ............. *H04W 48/16* (2013.01); *H04W 4/00* (2013.01); *H04W 48/10* (2013.01); *H04W 72/042* (2013.01); *H04W 88/02* (2013.01)

(58) Field of Classification Search
CPC ....................................................... H04L 12/28
USPC ............................................................ 370/329
See application file for complete search history.

(56) References Cited

U.S. PATENT DOCUMENTS

2011/0103288 A1  5/2011  Lee et al.
2013/0286960 A1  10/2013 Li et al.
(Continued)

FOREIGN PATENT DOCUMENTS

CN   104348573 A   2/2015
CN   105210311 A   12/2015
(Continued)

OTHER PUBLICATIONS

CATT, System information in NR. 3GPP TSG RAN WG2 Meeting #94 Nanjing, China, May 23-27, 2016, R2-163470, 3 pages.
(Continued)

*Primary Examiner* — Dang T Ton
(74) *Attorney, Agent, or Firm* — Fish & Richardson P.C.

(57) ABSTRACT

Embodiments of this application provide an information transmission method, a terminal device, and a network device. The method includes: receiving, by the terminal device, indication information sent by the network device, where the indication information includes information used to indicate content of M pieces of system information; receiving, by the terminal device, the M pieces of system information sent by the network device; determining, by the terminal device, at least two pieces of system information with same content in the M pieces of system information based on the indication information.

16 Claims, 5 Drawing Sheets

(51) Int. Cl.
*H04W 48/10* (2009.01)
*H04W 4/00* (2018.01)
*H04W 72/04* (2009.01)
*H04W 88/02* (2009.01)

(56) References Cited

U.S. PATENT DOCUMENTS

| | | |
|---|---|---|
| 2016/0119900 A1 | 4/2016 | You et al. |
| 2016/0183250 A1 | 6/2016 | Fang et al. |
| 2017/0230977 A1 | 8/2017 | Shen et al. |
| 2017/0311274 A1 | 10/2017 | Yu et al. |
| 2018/0367638 A1* | 12/2018 | Gayrard ............ H04W 72/1263 |

FOREIGN PATENT DOCUMENTS

| | | |
|---|---|---|
| CN | 105472528 A | 4/2016 |
| EP | 2987276 B1 | 2/2019 |
| JP | 2014532320 A | 12/2014 |
| JP | 2016522605 A | 7/2016 |

OTHER PUBLICATIONS

Huawei et al:"System information design", 3GPP Draft; R2-164127, vol .RAN WG2, No. Nanjing, China; May 22, 2016, XP051105444, 6 pages.

NEC:"System information on demand in standalone NR", 3GPP Draft;R2-163980, May 22, 2016, XP051105321, 4 pages.

European Search Report in European Application No. 17838770, dated Apr. 1, 2019, 7 pages.

PCT International Search Report and Written Opinion in International Appln. No. PCT/CN2017/096862, dated Oct. 31, 2017 (with English translation).

Office action issued in Japanese application No. 2019/506,732 dated Jan. 14, 2020, 6 pages (With English Translation).

* cited by examiner

INFORMATION TRANSMISSION METHOD, TERMINAL DEVICE, AND NETWORK DEVICE

CROSS-REFERENCE TO RELATED APPLICATIONS

This application is a continuation of International Application No. PCT/CN2017/096862, filed on Aug. 10, 2017, which is a continuation of claims priority to Chinese Patent Application No. 201610670036.X, filed on Aug. 12, 2016, The disclosures of the aforementioned applications are hereby incorporated by reference in their entireties.

TECHNICAL FIELD

This application relates to the communications field, and in particular, to an information transmission method, a terminal device, and a network device.

BACKGROUND

Spectrums are very valuable resources in wireless communications. An existing communications system usually works on a carrier frequency below 3 GHz. With emergence of smart terminals, particularly video services, current spectrum resources are difficult to meet an explosively growing user demand for capacity. A high frequency band with a larger available bandwidth, particularly a millimeter-wave band, gradually becomes a candidate frequency band of a next generation communications system.

Another advantage of using the high frequency band may be greatly reducing a size of multiple-antenna configuration, thereby facilitating site obtaining and deployment of more antennas. However, different from an operating band in a current system such as an LTE system, the high frequency band results in a relatively large path loss. Particularly, impact factors such as atmosphere and vegetation further increase a radio propagation loss.

For example, for transmission of a downlink common channel or a common reference signal, to overcome the relatively large propagation loss, a common-channel/common-signal transmission mechanism based on a beamforming technology is introduced, to obtain a relatively large antenna gain, so as to compensate for the loss in a common-channel/common-signal propagation process.

When transmission of the common channel (such as a broadcast channel, a synchronization signal, or system information) is based on the beamforming technology, a terminal device needs to separately demodulate a plurality of pieces of received system information, and this manner may result in unnecessary repeated demodulation by the terminal device. In addition, when user equipment is between two formed beams, demodulation based solely on system information received one time may result in unsatisfactory demodulation performance.

SUMMARY

Embodiments of this application provide an information transmission method, a terminal device, and a network device. The method can enable the terminal device to learn, according to indication information, whether content of system information is the same, and process system information with same content, thereby avoiding or alleviating a prior-art problem of repeated demodulation or unsatisfactory demodulation performance.

According to a first aspect, an information transmission method is provided, and the method includes:

receiving, by a terminal device, indication information sent by a network device, where the indication information includes information used to indicate content of M pieces of system information;

receiving, by the terminal device, the M pieces of system information sent by the network device;

determining, by the terminal device, at least two pieces of system information with same content in the M pieces of system information based on the indication information; and processing, by the terminal device, the at least two pieces of system information, where M is a positive integer greater than or equal to 2.

Therefore, in this embodiment of this application, the terminal device can learn, based on the indication information, whether the content of the system information is the same, and process system information with same content, thereby avoiding or alleviating a prior-art problem of repeated demodulation or unsatisfactory demodulation performance.

It should be understood that the indication information sent by the network device may include information used to indicate content of N pieces of system information. The indication information received by the terminal device may include the information used to indicate the content of the M pieces of system information.

It should be understood that N may be a positive integer greater than or equal to M. Specifically, when N is greater than M, the network device may send the indication information to a plurality of terminal devices, and therefore, the indication information sent by the network device may include the information used to indicate the content of the N pieces of system information corresponding to the plurality of terminal devices. The indication information received by the terminal device may be used to indicate the information about the content of the M pieces of system information corresponding to the terminal device. When N is equal to M, the M pieces of system information herein may be M pieces of system information that can be received by the terminal device. The indication information may include the information used to indicate the content of the M pieces of system information. However, this embodiment of this application is not limited thereto. For example, the indication information sent by the network device may further include information used to indicate content of system information that can be received by another terminal device. This is not limited in this embodiment of this application.

It should be understood that, in this embodiment of this application, the network device may send the indication information in a plurality of manners, and the plurality of manners are separately described below by using examples.

In a first manner, the network device sends a broadcast message to the terminal device, and the broadcast message carries the indication information.

For example, the network device may send the broadcast message by using a downlink broadcast channel. Optionally, the downlink broadcast channel may be a physical broadcast channel (Physical Broadcast Channel, PBCH) in an LTE system, or may be a new broadcast channel in a next generation communications system, for example, a New Radio broadcast channel (New Radio Broadcast Channel, NR-BCH). This embodiment of this application is not limited thereto.

In a second manner, the network device sends control information to the terminal device, and the control information carries the indication information.

The control information may further include scheduling information of a channel for sending system information to the terminal device, and the scheduling information includes indication information such as resource allocation and a modulation and coding scheme of the channel for sending the system information.

Optionally, the channel used to send the system information may be a physical shared channel or an enhanced broadcast channel. This is not limited herein.

For example, the control information may be downlink control information. When a physical resource block used for transmitting the system information is dynamically scheduled, scheduling information of the physical resource block is usually carried in physical downlink control information. In this embodiment of this application, the indication signaling is carried in the downlink control information. A channel used to transmit the downlink control information may be a physical downlink control channel, such as a New Radio-physical downlink control channel (New Radio-Physical Downlink Control Channel, NR-PDCCH), but this embodiment of this application is not limited thereto.

Optionally, in the first manner, each of the M pieces of system information is associated with or corresponds to one piece of broadcast information/one broadcast channel resource.

In the second manner, each of the M pieces of system information is associated with or corresponds to one piece of control information/one control channel resource.

It should be understood that, in this embodiment of this application, specific content of the indication information is not limited, provided that the indication information includes the information used to indicate the content of the M pieces of system information.

For example, the information used to indicate the content of the M pieces of system information in this embodiment of this application may include M pieces of content indication information. One of the M pieces of system information corresponds to one of the M pieces of content indication information, and one piece of content indication information corresponding to each piece of system information may be used to indicate content of the system information.

Alternatively, the information used to indicate the content of the M pieces of system information in this embodiment of this application may include M pieces of content indication information. One of the M pieces of system information corresponds to one piece of content indication information, and one piece of content indication information corresponding to each piece of system information may be used to indicate content of the M pieces of system information.

Alternatively, the information used to indicate the content of the M pieces of system information in this embodiment of this application may include one piece of content indication information, and this piece of content indication information may also be referred to as public indication information. The public indication information can indicate content corresponding to each of the M pieces of system information.

Preferably, in this embodiment of this application, each of the M pieces of system information corresponds to one piece of content indication information, and this piece of content indication information is used to indicate content of this piece of system information. One piece of content indication information corresponding to one piece of system information may be a resource identifier, a resource group identifier, a content identifier, or the like corresponding to this piece of system information. This embodiment of this application is not limited thereto.

Specifically, the information used to indicate the content of the M pieces of system information includes at least one of the following:

a resource identifier corresponding to each of the M pieces of system information, a resource group identifier corresponding to each of the M pieces of system information, and a content identifier corresponding to each of the M pieces of system information.

For example, the indication information sent by the network device includes a content identifier corresponding to each of the N pieces of system information, and the indication information corresponding to the M pieces of system information received by the terminal device may include the content identifier corresponding to each of the M pieces of system information.

The indication information sent by the network device includes a resource identifier corresponding to each of the N pieces of system information, and the indication information corresponding to the M pieces of system information received by the terminal device may include the resource identifier corresponding to each of the M pieces of system information.

The indication information sent by the network device includes a resource group identifier corresponding to each of the N pieces of system information, and the indication information corresponding to the M pieces of system information received by the terminal device may include the resource group identifier corresponding to each of the M pieces of system information.

It should be understood that, in this embodiment of this application, the N pieces of system information sent by the network device may be in a same system information transmission period, or may be in at least two system information transmission periods. This embodiment of this application is not limited thereto.

It should be understood that the network device may send the N pieces of system information to the terminal device by using N resources, and each resource may carry one piece of system information. For example, each resource may correspond to one formed beam, and the terminal device may receive the M pieces of system information carried in M of the N resources, but this embodiment of this application is not limited thereto.

It should be understood that, in this embodiment of this application, the at least two pieces of system information may be processed in a plurality of manners. For example, optionally, in an implementation, the terminal device performs combined demodulation on the at least two pieces of system information.

In the prior art, a terminal device needs to demodulate each piece of received system information. However, when signal quality of a single piece of system information received by the terminal device is relatively poor, the terminal device may not correctly demodulate the system information. In this embodiment of this application, combined demodulation is performed on the at least two pieces of system information with same content. When received signal quality of a single piece of system information is relatively poor, received signal quality and system information transmission reliability can be improved by receiving and combining the at least two pieces of system information with same content, thereby avoiding or alleviating a prior-art problem of repeated demodulation or unsatisfactory demodulation performance.

It should be understood that "combined demodulation" in this embodiment of this application may also be referred to as "joint decoding". The joint decoding may include a soft combination (for example, a typical combination manner—Chase Combining). For example, in this embodiment of this application, the terminal device may perform soft combination on the at least two pieces of system information, thereby obtaining the correctly demodulated system information. However, this embodiment of this application is not limited thereto.

It should be understood that a combination manner of the at least two pieces of system information is not limited in this embodiment of this application. For example, the combination manner may be combining the at least two pieces of system information before detection, or may be combining the at least two pieces of system information after detection. This embodiment of this application is not limited thereto.

For another example, alternatively, in another implementation, the terminal device demodulates first system information in the at least two pieces of system information, and skips demodulating system information other than the first system information in the at least two pieces of system information.

It should be further understood that the first system information may include one of the at least two pieces of system information, or may include a plurality of pieces of the at least two pieces of system information, provided that the first system information is a part of the at least two pieces of system information.

In the prior art, because the terminal device does not know specific content of the received system information before demodulating the system information, each piece of system information needs to be demodulated. In this embodiment of this application, only the first system information in the at least two pieces of system information may be demodulated, and demodulation of system information other than the first system information in the at least two pieces of system information may be skipped. Because the at least two pieces of system information have same content, the system information can be obtained by demodulating only the first system information, without the need of demodulating other system information with same content.

Therefore, in this embodiment of this application, the indication information indicates whether content of each piece of system information received by the terminal device is the same. When the terminal device determines, based on the indication information, content of the at least two pieces of received system information is the same, only the first system information in the at least two pieces of system information may be demodulated. When the first system information is correctly demodulated, the terminal device skips demodulating other system information in the at least two pieces of system information. Therefore, in this embodiment of this application, to ensure that the system information is correctly demodulated, only the first system information needs to be demodulated, and the terminal device does not need to frequently and redundantly detect the system information that carries same content. Therefore, this embodiment of this application can avoid a prior-art problem of repeated demodulation or unsatisfactory demodulation performance, and can reduce power consumption of the terminal device, shorten information demodulation time, and improve system efficiency.

According to a second aspect, an information transmission method is provided, including:

sending, by a network device, indication information to a terminal device, where the indication information includes information used to indicate content of N pieces of system information, and the indication information is used by the terminal device to determine at least two pieces of system information with same content in the N pieces of system information, and process the at least two pieces of system information; and sending, by the network device, the N pieces of system information to the terminal device, where N is a positive integer greater than or equal to 2.

Therefore, in this embodiment of this application, the network device sends the indication information to the terminal, so that the terminal device can learn, based on the indication information, whether content of the received system information is the same, and process system information with same content, thereby avoiding or alleviating a prior-art problem of repeated demodulation or unsatisfactory demodulation performance.

It should be understood that the second aspect corresponds to the first aspect, the first aspect is performed by the terminal device, and the second aspect may be performed by the network device. For a corresponding characteristic of the method on a network device side, refer to the description of the first aspect. Therefore, for brevity, detailed descriptions are appropriately omitted.

Optionally, the indication information sent by the network device to the terminal device is used by the terminal device to perform combined demodulation on the at least two pieces of system information based on the indication information.

Optionally, the indication information sent by the network device to the terminal device is used by the terminal device to demodulate first system information in the at least two pieces of system information based on the indication information, and skip demodulating system information other than the first system information in the at least two pieces of system information.

Optionally, the sending, by a network device, indication information to a terminal device includes: sending, by the network device, a broadcast message to the terminal device, where the broadcast message carries the indication information.

Optionally, the sending, by a network device, indication information to a terminal device includes: sending, by the network device, control information to the terminal device, where the control information carries the indication information.

Optionally, the information used to indicate the content of the N pieces of system information includes at least one of the following:

a resource identifier corresponding to each of the N pieces of system information, a resource group identifier corresponding to each of the N pieces of system information, and a content identifier corresponding to each of the N pieces of system information.

Optionally, the at least two pieces of system information are in a same system information transmission period; or the at least two pieces of system information are in at least two system information transmission periods.

Therefore, in this embodiment of this application, the network device sends the indication information to the terminal device, so that the terminal device can learn, based on the indication information, whether content of the received system information is the same, and process system information with same content, thereby avoiding or alleviating a prior-art problem of repeated demodulation or unsatisfactory demodulation performance.

In addition, in this embodiment of this application, the terminal device may further perform combined demodulation on the at least two pieces of system information with same content. When received signal quality of a single piece of system information is relatively poor, received signal quality and system information transmission reliability can be improved by receiving and combining the at least two pieces of system information with same content, thereby avoiding or alleviating a prior-art problem of repeated demodulation or unsatisfactory demodulation performance.

In this embodiment of this application, the terminal device may further demodulate the first system information in the at least two pieces of system information, and when the first system information is correctly demodulated, skip demodulating other system information in the at least two pieces of system information. Therefore, in this embodiment of this application, to ensure that the system information is correctly demodulated, only the first system information needs to be demodulated, and the terminal device does not need to frequently and redundantly detect the system information that carries same content. Therefore, this embodiment of this application can avoid a prior-art problem of repeated demodulation or unsatisfactory demodulation performance, and can reduce power consumption of the terminal device, shorten information demodulation time, and improve system efficiency.

According to a third aspect, a terminal device is provided and configured to perform the method in the first aspect or any possible implementation of the first aspect. Specifically, the terminal device includes units configured to perform the foregoing method.

According to a fourth aspect, a network device is provided and configured to perform the method in the second aspect or any possible implementation of the second aspect. Specifically, the terminal device includes units configured to perform the foregoing method.

According to a fifth aspect, a terminal device is provided. The terminal device includes a processor and a memory. The memory is configured to store a computer program. The processor is configured to perform the computer program stored in the memory, and perform the method in the first aspect or any possible implementation of the first aspect.

According to a sixth aspect, a network device is provided. The network device includes a processor and a memory. The memory is configured to store a computer program. The processor is configured to perform the computer program stored in the memory, and perform the method in the second aspect or any possible implementation of the second aspect. Specifically, the terminal device includes units configured to perform the foregoing method.

According to a seventh aspect, a computer readable medium is provided and configured to store a computer program. The computer program includes an instruction used to perform the method in the first aspect or any possible implementation of the first aspect.

According to an eighth aspect, a computer readable medium is provided and configured to store a computer program. The computer program includes an instruction used to perform the method in the second aspect or any possible implementation of the second aspect.

DESCRIPTION OF EMBODIMENTS

Figure 1:
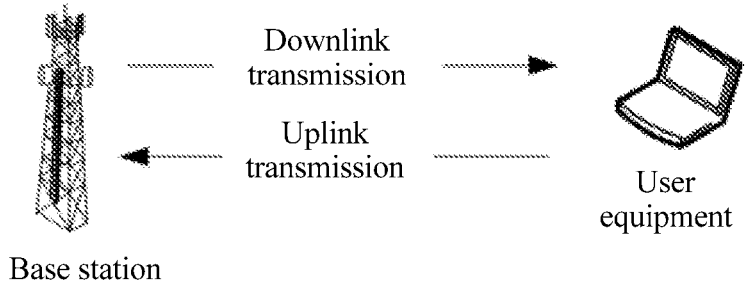
FIG. 1 is a scenario diagram of a communications system to which an embodiment of this application can be applied.

The following describes technical solutions of this application with reference to accompanying drawings.

It should be understood that, the technical solutions of the embodiments of this application may be applied to various communications systems, such as: a Global System for Mobile Communications (Global System for Mobile communications, GSM) system, a Code Division Multiple Access (Code Division Multiple Access, CDMA) system, a Wideband Code Division Multiple Access (Wideband Code Division Multiple Access, WCDMA) system, a general packet radio service (General Packet Radio Service, GPRS), a Long Term Evolution (Long Term Evolution, LTE) system, an LTE frequency division duplex (Frequency Division Duplex, FDD) system, an LTE time division duplex (Time Division Duplex, TDD) system, a Universal Mobile Telecommunications System (Universal Mobile Telecommunications System, UMTS) system, and a Worldwide Interoperability for Microwave Access (Worldwide Interoperability for Microwave Access, WiMAX) communications system. The embodiments of this application are not limited thereto.

It should also be understood that, in the embodiments of this application, a network device may be a base transceiver station (Base Transceiver Station, BTS) in a GSM system or a Code Division Multiple Access (Code Division Multiple Access, CDMA) system, a NodeB (NodeB, NB) in a WCDMA system, an evolved NodeB (Evolved NodeB, eNB or eNodeB) in an LTE system, or a radio controller in a cloud radio access network (Cloud Radio Access Network, CRAN). Alternatively, the network device may be a relay station, an access point, an in-vehicle device, a wearable device, a network side device in a future 5G network, a network device in a future evolved public land mobile network (Public Land Mobile Network, PLMN), or the like.

A terminal device in the embodiments of this application may also be referred to as an access terminal, user equipment (User Equipment, UE), a subscriber unit, a subscriber station, a mobile station, a mobile console, a remote station, a remote terminal, a mobile device, a user terminal, a terminal, a wireless communications device, a user agent, a user apparatus, or the like. The access terminal may be a cellular phone, a cordless phone, a Session Initiation Protocol (Session Initiation Protocol, SIP) phone, a wireless local loop (Wireless Local Loop, WLL) station, a personal digital assistant (Personal Digital Assistant, PDA), a handheld device having a wireless communication function, a computing device, another processing device connected to a wireless modem, an in-vehicle device, a wearable device, a terminal device in a future 5G network, or a terminal device in a future evolved public land mobile network (Public Land Mobile Network, PLMN).

For ease of understanding and description, by way of example but not limitation, the following describes execution processes and actions of an information transmission method and a device of this application in a communications system.

FIG. 1 is a scenario diagram of a communications system to which an embodiment of this application can be applied. In FIG. 1, the communications system includes a network device and a terminal device, and the network device and the terminal device communicate with each other by using a cellular network resource or an unlicensed spectrum resource. In FIG. 1, an example in which the network device is a base station and the terminal device is user equipment is used for description. For example, in FIG. 1, the network device may send system information to the terminal device, and the terminal device may establish a connection to the network device based on the system information, so that downlink transmission and uplink transmission can be performed between the network device and the terminal device. The network device may send the system information to the terminal device by using a plurality of resources, and each resource may carry one piece of system information. For example, each resource may correspond to one formed beam. In other words, the network device may send one piece of system information to the terminal device based on one formed beam, so that a plurality of pieces of system information can be sent based on a plurality of formed beams. This embodiment of this application is not limited thereto.

It should be understood that the terminal device may communicate with a base station in a radio access network, or may communicate with a core network by using a base station in a radio access network, or may further communicate with a public switched telephone network (Public Switched Telephone Network, "PSTN" for short) or another network or even the entire Internet. This is not limited in this embodiment of this application.

Figure 2:
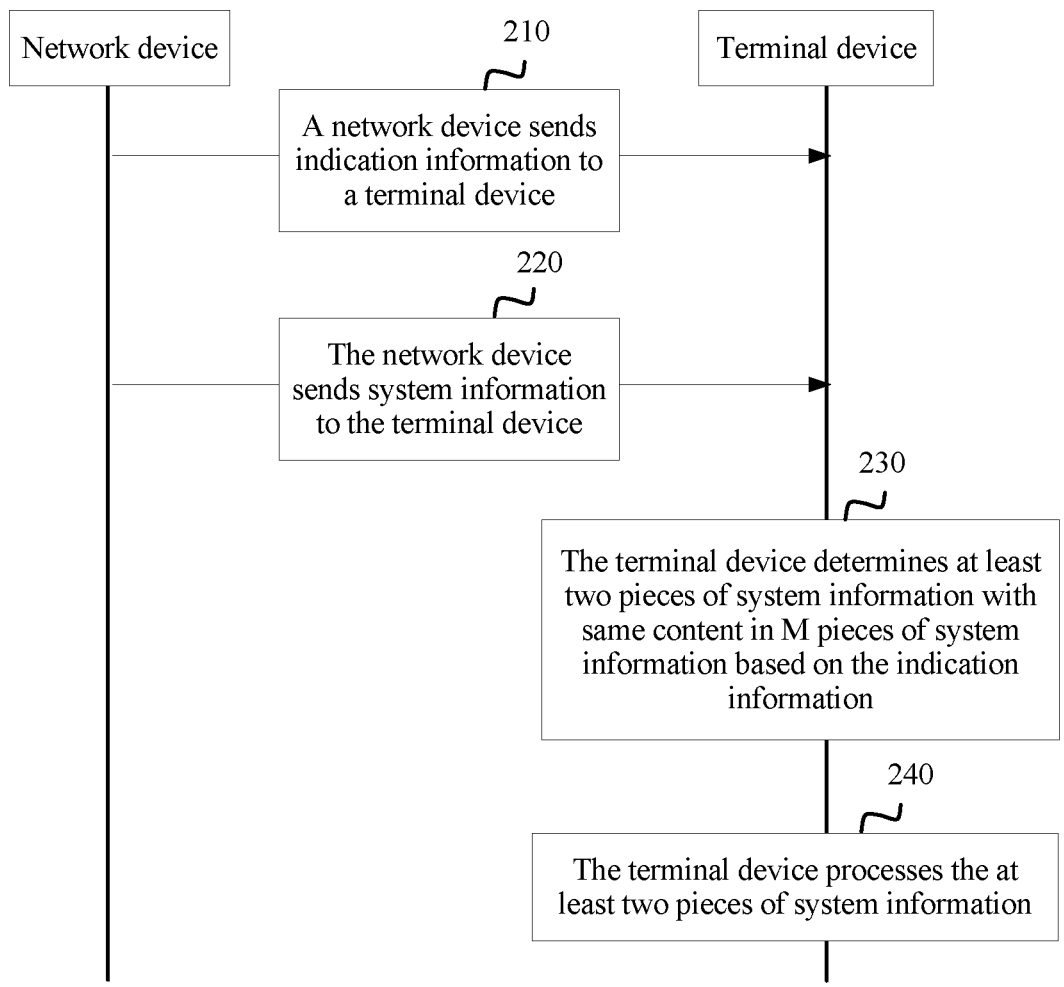
FIG. 2 is a schematic flowchart of an information transmission method according to an embodiment of this application.

FIG. 2 is a schematic flowchart of an information transmission method according to an embodiment of this application. The method shown in FIG. 2 can be applied to the foregoing communications systems, and a communications system to which this embodiment of this application can be applied includes a network device and a terminal device. A method 200 shown in FIG. 2 includes the following steps.

210. The network device sends indication information to the terminal device.

Specifically, the terminal device sends the indication information to the terminal device, and the indication information includes information used to indicate content of N pieces of system information.

Correspondingly, the terminal device may receive M of the N pieces of system information sent by the network device and content of indication information corresponding to the M pieces of system information. For example, the indication information received by the terminal device may include information used to indicate content of the M pieces of system information.

It should be understood that N may be a positive integer greater than or equal to M. Specifically, when N is greater than M, the network device may send the indication information to a plurality of terminal devices, and therefore, the indication information sent by the network device may include information used to indicate the content of the N pieces of system information corresponding to the plurality of terminal devices. The indication information received by the terminal device may be used to indicate only the information about the content corresponding to the M pieces of system information received by the terminal device. When N is equal to M, the M pieces of system information herein may be M pieces of system information that can be received by the terminal device. The indication information in this embodiment of this application may include the information used to indicate the content of the M pieces of system information. However, this embodiment of this application is not limited thereto. For example, the indication information sent by the network device may further include information used to indicate content of system information that can be received by another terminal device. This is not limited in this embodiment of this application.

It should be understood that, in this embodiment of this application, the network device may send the indication information in a plurality of manners, and the plurality of manners are separately described below by using examples.

In a first manner, the network device sends a broadcast message to the terminal device, and the broadcast message carries the indication information.

For example, the network device may send the broadcast message by using a downlink broadcast channel. Optionally, the downlink broadcast channel may be a physical broadcast channel PBCH in an LTE system, or may be a new broadcast channel in a next generation system, for example, a New Radio broadcast channel (New Radio Broadcast Channel, NR-BCH). This embodiment of this application is not limited thereto.

In a second manner, the network device sends control information to the terminal device, and the control information carries the indication information.

The control information may further include scheduling information of a channel for sending system information to the terminal device, and the scheduling information includes indication information such as resource allocation and a modulation and coding scheme of the channel for sending the system information.

Optionally, the channel used to send the system information may be a physical shared channel or an enhanced broadcast channel. This is not limited herein.

For example, the control information may be downlink control information. When a physical resource block used for transmitting the system information is dynamically scheduled, scheduling information of the physical resource block is usually carried in physical downlink control information. In this embodiment of this application, the indication signaling is carried in the downlink control information. A channel used to transmit the downlink control information may be a physical downlink control channel, such as a New Radio—physical downlink control channel (New Radio—Physical Downlink Control Channel, NR-PDCCH), but this embodiment of this application is not limited thereto.

Optionally, in the first manner, each of the M pieces of system information is associated with or corresponds to one piece of broadcast information/one broadcast channel resource.

In the second manner, each of the M pieces of system information is associated with or corresponds to one piece of control information/one control channel resource.

It should be understood that, in this embodiment of this application, specific content of the indication information is not limited, provided that the indication information includes the information used to indicate the content of the M pieces of system information.

For example, the information used to indicate the content of the M pieces of system information in this embodiment of this application may include M pieces of content indication information. One of the M pieces of system information corresponds to one of the M pieces of content indication information, and one piece of content indication information corresponding to each piece of system information may be used to indicate content of the system information.

Alternatively, the information used to indicate the content of the M pieces of system information in this embodiment of this application may include M pieces of content indication information. One of the M pieces of system information corresponds to one piece of content indication information, and one piece of content indication information corresponding to each piece of system information may be used to indicate content of the M pieces of system information.

Alternatively, the information used to indicate the content of the M pieces of system information in this embodiment of this application may include one piece of content indication information, and this piece of content indication information may also be referred to as public indication information. The public indication information can indicate content corresponding to each of the M pieces of system information.

Preferably, in this embodiment of this application, each of the M pieces of system information corresponds to one piece of content indication information, and this piece of content indication information is used to indicate content of this piece of system information. One piece of content indication information corresponding to one piece of system information may be a resource identifier, a resource group identifier, a content identifier, or the like corresponding to this piece of system information. This embodiment of this application is not limited thereto.

Specifically, the information used to indicate the content of the M pieces of system information includes at least one of the following:

a resource identifier corresponding to each of the M pieces of system information, a resource group identifier corresponding to each of the M pieces of system information, and a content identifier corresponding to each of the M pieces of system information.

For example, the indication information sent by the network device includes a content identifier corresponding to each of the N pieces of system information, and the indication information corresponding to the M pieces of system information received by the terminal device may include the content identifier corresponding to each of the M pieces of system information.

The indication information sent by the network device includes a resource identifier corresponding to each of the N pieces of system information, and the indication information corresponding to the M pieces of system information received by the terminal device may include the resource identifier corresponding to each of the M pieces of system information.

The indication information sent by the network device includes a resource group identifier corresponding to each of the N pieces of system information, and the indication information corresponding to the M pieces of system information received by the terminal device may include the resource group identifier corresponding to each of the M pieces of system information.

It should be understood that, in this embodiment of this application, the N pieces of system information sent by the network device may be in a same system information transmission period, or may be in at least two system information transmission periods. This embodiment of this application is not limited thereto.

The following separately describes the indication information in detail by using examples.

For example, the indication information corresponding to the M pieces of system information received by the terminal device may include a content identifier corresponding to each of the M pieces of system information.

Figure 3:
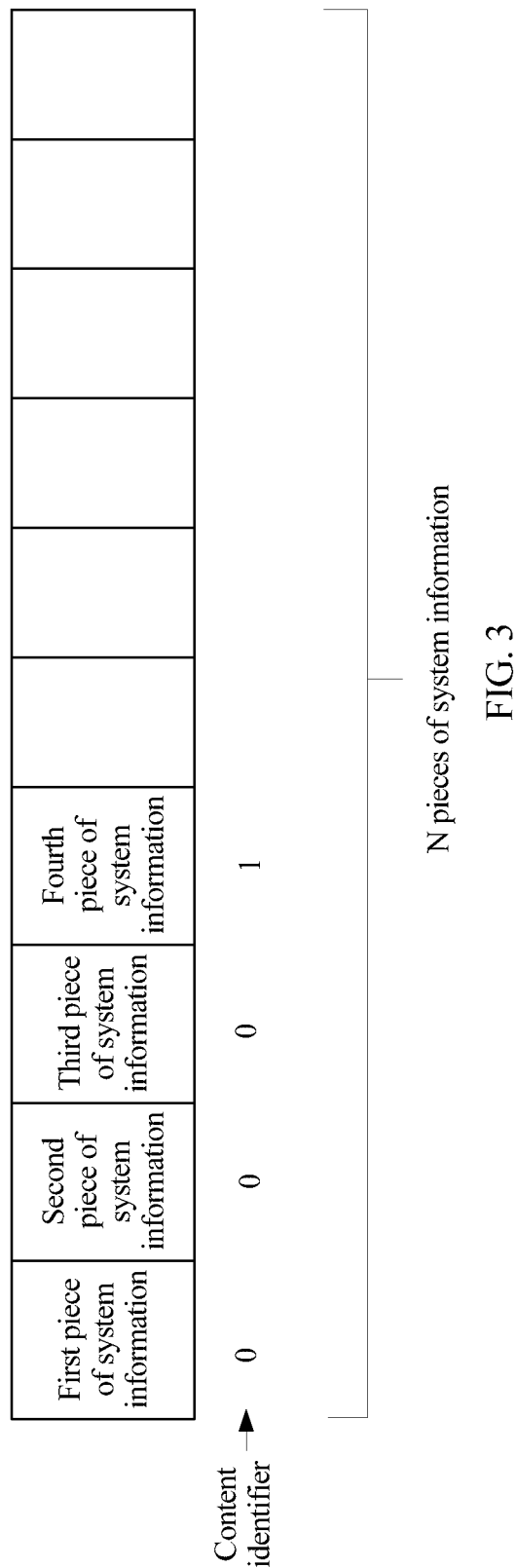
FIG. 3 is a schematic block diagram of a content identifier of system information according to an embodiment of this application.

For example, as shown in FIG. 3, the M pieces of system information are four pieces of system information in a same transmission period, and content identifiers corresponding to a first piece of system information to a fourth piece of system information are respectively 0, 0, 0, and 1.

In this case, the terminal device may determine, based on the indication information corresponding to the M pieces of system information, that content of the first piece of system information to the third piece of system information is the same.

Figure 4:
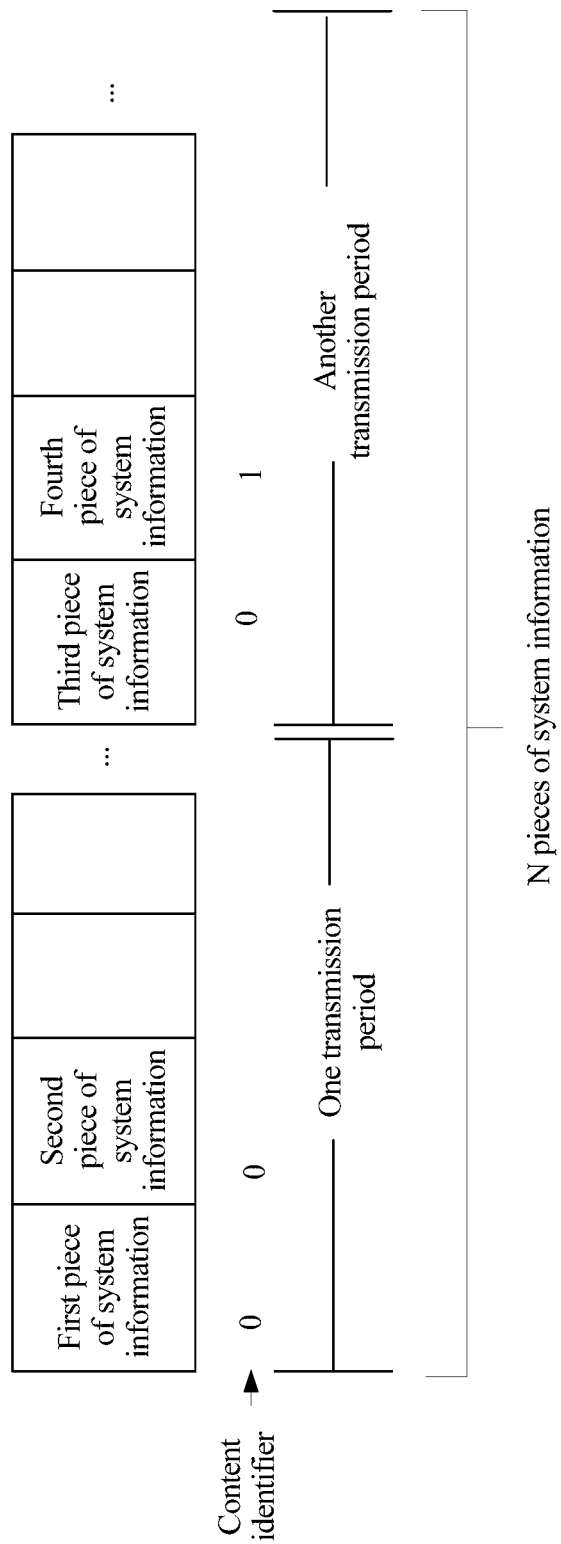
FIG. 4 is a schematic block diagram of a content identifier of system information according to another embodiment of this application.

As shown in FIG. 4, the M pieces of system information may be four pieces of system information in two different transmission periods. For example, as shown in FIG. 4, content identifiers corresponding to the four pieces of system information including a first piece of system information to a fourth piece of system information are respectively 0, 0, 0, and 1. The first piece of system information and the second piece of system information are in a same transmission period, and the third piece of system information and the fourth piece of system information are in another transmission period.

In this case, the terminal device may determine, based on the indication information corresponding to the M pieces of system information, that content of the first piece of system information to the third piece of system information is the same.

For another example, as shown in Table 1, the M pieces of system information are four pieces of system information, and resource identifiers corresponding to the four pieces of system information are respectively a resource 1, a resource 2, a resource 3, and a resource 4. A preset correspondence between a resource identifier and system information content may be that the resource 1 to the resource 3 correspond to content of a first type of system information, in other words, content of the system information carried on the resource 1 to the resource 3 is the same; and the resource 4 corresponds to content of a second type of system information. Then after determining, based on the indication information, the resource identifier corresponding to the system information, the terminal device may determine, based on the preset correspondence between a resource identifier and system information content, which pieces of system information have same content. Herein, the first piece of system information to the fourth piece of system information may be system information in a same transmission period, or may be system information in different transmission periods. This is not limited in this embodiment of this application.

TABLE 1

| System information | Resource identifier corresponding to the system information |
|---|---|
| First piece of system information | Resource 1 |
| Second piece of system information | Resource 2 |
| Third piece of system information | Resource 3 |
| Fourth piece of system information | Resource 4 |

Alternatively, the indication information corresponding to the M pieces of system information received by the terminal device may include a resource group identifier corresponding to each of the M pieces of system information. After determining the resource group identifier corresponding to each piece of system information, the terminal device may determine, based on a correspondence between a resource group identifier and system information content, which pieces of system information have same content, and which pieces of system information have different content.

For example, as shown in Table 2, the M pieces of system information are four pieces of system information, and resource group identifiers corresponding to the four pieces of system information including a first piece of system information to a fourth piece of system information are respectively a resource group 1, a resource group 1, a resource group 1, and a resource group 2. The preset correspondence between a resource group identifier and system information may be that content of system information carried on resources in a same resource group is the same, to be specific, the first piece of system information to the third piece of system information carried on the resource 1 to the resource 3 have same content. Herein, the first piece of system information to the fourth piece of system information may be system information in a same transmission period, or may be system information in different transmission periods. This is not limited in this embodiment of this application.

TABLE 2

| System information | Resource group identifier corresponding to the system information |
| --- | --- |
| First piece of system information | Resource group 1 |
| Second piece of system information | Resource group 1 |
| Third piece of system information | Resource group 1 |
| Fourth piece of system information | Resource group 2 |

Therefore, in this embodiment of this application, the network device sends the indication information to the terminal device, so that the terminal device can learn, based on the indication information, whether the content of the system information is the same, and process system information with same content, thereby avoiding or alleviating a prior-art problem of repeated demodulation or unsatisfactory demodulation performance.

It should be noted that the foregoing described examples of the indication information are merely intended to help a person skilled in the art understand this embodiment of this application and are merely for illustration purposes, and the indication information may be in another form. This embodiment of this application is not limited thereto.

220. The network device sends system information to the terminal device.

Specifically, the network device sends the N pieces of system information to the terminal device. The terminal device can receive M of the N pieces of system information.

Specifically, in this embodiment of this application, the network device may first send the indication information corresponding to the system information to the terminal device, and then send the system information to the terminal device. Therefore, the terminal device may determine, according to the received indication information, which pieces of system information have same content before demodulating the system information.

For example, the network device may send the N pieces of system information by using N resources, each resource carries one piece of system information, and the terminal device may receive the M pieces of system information carried in M of the N resources. Optionally, one resource herein may correspond to one formed beam, but this embodiment of this application is not limited thereto.

230. The terminal device determines at least two pieces of system information with same content in M pieces of system information based on the indication information.

According to the information that is used to indicate the content of the M pieces of system information and that is included in the indication information, the terminal device may determine which pieces of system information in the M pieces of system information have same content.

For example, as shown in FIG. 3 or FIG. 4, the M pieces of system information are four pieces of system information, and content identifiers corresponding to the four pieces of system information are respectively 0, 0, 0, and 1.

The terminal device may determine, based on the content identifiers corresponding to the M pieces of system information, that the first piece of system information to the third piece of system information have same content.

For another example, as shown in Table 1, the M pieces of system information are four pieces of system information, and resource identifiers corresponding to the four pieces of system information are respectively a resource 1, a resource 2, a resource 3, and a resource 4. A preset correspondence between a resource identifier and system information content may be that the resource 1 to the resource 3 correspond to content of a first type of system information, in other words, content of the system information carried on the resource 1 to the resource 3 is the same; and the resource 4 corresponds to content of a second type of system information. The terminal device may determine, based on the resource identifiers corresponding to the system information and the preset correspondence between a resource identifier and system information content, that the first piece of system information to the third piece of system information have same content.

For another example, as shown in Table 2, the M pieces of system information are four pieces of system information, and resource group identifiers corresponding to the four pieces of system information are respectively a resource group 1, a resource group 1, a resource group 1, and a resource group 2. A preset correspondence between a resource group identifier and system information may be that content of system information carried on resources in a same resource group is the same. The terminal device may determine, based on the resource group identifiers corresponding to the system information and the preset correspondence between a resource group identifier and system information content, that the first piece of system information to the third piece of system information have same content.

240. The terminal device processes the at least two pieces of system information.

It should be understood that, in this embodiment of this application, the at least two pieces of system information may be processed in a plurality of manners. For example, optionally, in an implementation, the terminal device performs combined demodulation on the at least two pieces of system information.

In the prior art, a terminal device needs to demodulate each piece of received system information. However, when received signal quality of a single piece of system information received by the terminal device is relatively poor, the terminal device may not correctly demodulate the system information. In this embodiment of this application, combined demodulation is performed on the at least two pieces of system information with same content. Even when received signal quality of a single piece of system information is relatively poor, received signal quality and system information transmission reliability can be improved by receiving and combining the system information with same content, thereby avoiding or alleviating a prior-art problem of repeated demodulation or unsatisfactory demodulation performance.

It should be understood that "combined demodulation" in this embodiment of this application may also be referred to as "joint decoding". The joint decoding may include a soft combination (for example, a typical combination manner—Chase Combining). For example, in this embodiment of this application, the terminal device may perform soft combination on the at least two pieces of system information, thereby obtaining the correctly demodulated system information. However, this embodiment of this application is not limited thereto.

It should be understood that a combination manner (or a joint manner) of the at least two pieces of system information is not limited in this embodiment of this application. For example, the combination manner may be combining the at least two pieces of system information before detection, or may be combining the at least two pieces of system information after detection. This embodiment of this application is not limited thereto.

For another example, alternatively, in another implementation, the terminal device demodulates first system information in the at least two pieces of system information, and skips demodulating system information other than the first system information in the at least two pieces of system information.

It should be further understood that the first system information may include one of the at least two pieces of system information, or may include a plurality of pieces of the at least two pieces of system information, provided that the first system information is a part of the at least two pieces of system information.

In the prior art, because the terminal device does not know specific content of the received system information before demodulating the system information, each piece of system information needs to be demodulated. In this embodiment of this application, only the first system information in the at least two pieces of system information may be demodulated, and demodulation of system information other than the first system information in the at least two pieces of system information may be skipped. Because the at least two pieces of system information have same content, the system information can be obtained by demodulating only the first system information, without the need of demodulating other system information with same content.

Therefore, in this embodiment of this application, the indication information indicates whether content of each piece of system information received by the terminal device is the same. When the terminal device determines, based on the indication information, content of the at least two pieces of received system information is the same, only the first system information in the at least two pieces of system information may be demodulated. When the first system information is correctly demodulated, the terminal device skips demodulating other system information in the at least two pieces of system information. Therefore, in this embodiment of this application, to ensure that the system information is correctly demodulated, only the first system information needs to be demodulated, and the terminal device does not need to frequently and redundantly detect the system information that carries same content. Therefore, this embodiment of this application can avoid a prior-art problem of repeated demodulation or unsatisfactory demodulation performance, and can reduce power consumption of the terminal device, shorten information demodulation time, and improve system efficiency.

The foregoing describes in detail the information transmission method according to the embodiments of this application with reference to FIG. 2 to FIG. 4. It should be noted that examples in FIG. 2 to FIG. 4 are merely intended to help a person skilled in the art understand the embodiments of this application instead of limiting the embodiments of this application to a specific value or a specific scenario shown in the examples. Apparently, a person skilled in the art can make various equivalent modifications or changes according to the examples given in FIG. 2 to FIG. 4, and such modifications or changes also fall within the scope of the embodiments of this application.

Figure 5:
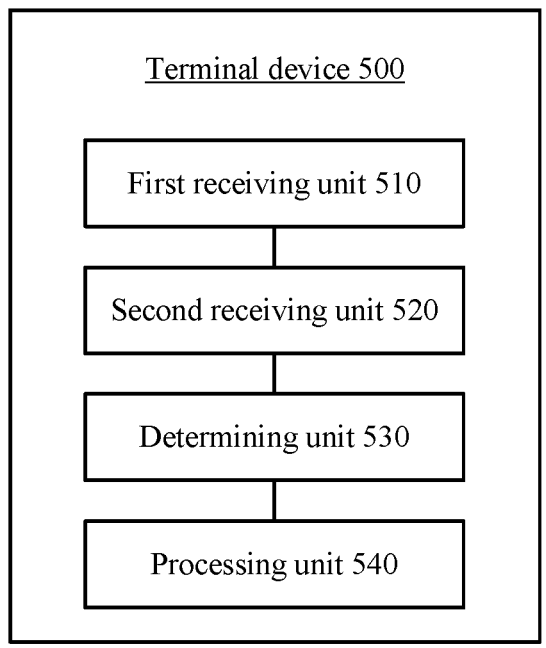
FIG. 5 is a schematic block diagram of a terminal device according to an embodiment of this application.
Figure 6:
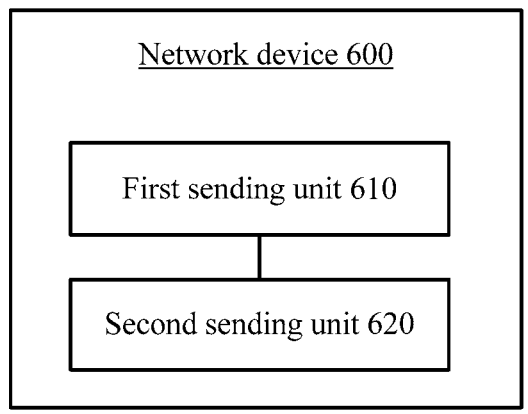
FIG. 6 is a schematic block diagram of a network device according to another embodiment of this application.
Figure 7:
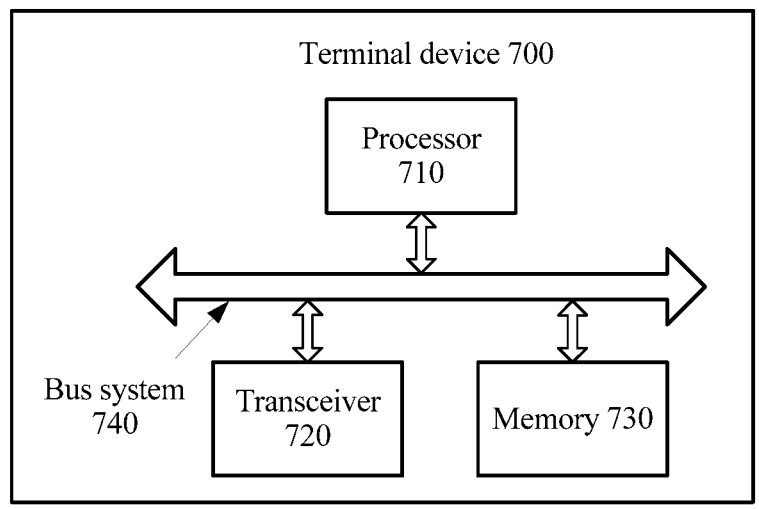
FIG. 7 is a schematic block diagram of a terminal device according to another embodiment of this application.
Figure 8:
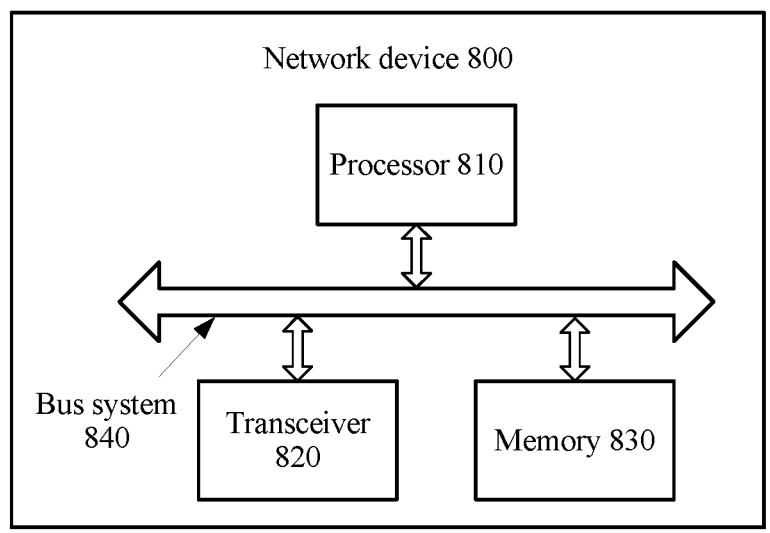
FIG. 8 is a schematic block diagram of a network device according to another embodiment of this application.

The following describes a terminal device in embodiments of this application with reference to FIG. 5 and FIG. 7, and describes a network device in embodiments of this application with reference to FIG. 6 and FIG. 8.

FIG. 5 is a schematic block diagram of a terminal device 500 for signal transmission according to an embodiment of this application. As shown in FIG. 5, the terminal device 500 includes:

a first receiving unit 510, configured to receive indication information sent by a network device, where the indication information includes information used to indicate content of M pieces of system information;

a second receiving unit 520, configured to receive the M pieces of system information sent by the network device;

a determining unit 530, configured to determine at least two pieces of system information with same content in the M pieces of system information based on the indication information; and a processing unit 540, configured to process the at least two pieces of system information, where M is a positive integer greater than or equal to 2.

Therefore, in this embodiment of this application, the terminal device can learn, based on the indication information, whether the content of the system information is the same, and process system information with same content, thereby avoiding or alleviating a prior-art problem of repeated demodulation or unsatisfactory demodulation performance.

Optionally, the processing unit 540 is specifically configured to perform combined demodulation on the at least two pieces of system information.

Alternatively, the processing unit 540 is specifically configured to: demodulate first system information in the at least two pieces of system information, and skip demodulating system information other than the first system information in the at least two pieces of system information.

Optionally, the first receiving unit 510 is specifically configured to receive a broadcast message sent by the network device, where the broadcast message carries the indication information.

Alternatively, the first receiving unit 510 is specifically configured to receive control information sent by the network device, where the control information carries the indication information.

Optionally, the information used to indicate the content of the M pieces of system information includes at least one of the following:

a resource identifier corresponding to each of the M pieces of system information, a resource group identifier corresponding to each of the M pieces of system information, and a content identifier corresponding to each of the M pieces of system information.

Optionally, the at least two pieces of system information are in a same system information transmission period; or the at least two pieces of system information are in at least two system information transmission periods.

It should be understood that the terminal device 500 shown in FIG. 5 can implement processes related to the terminal device in the method embodiment in FIG. 2. Operations and/or functions of modules in the terminal device 500 are respectively used to implement corresponding procedures in the method embodiment in FIG. 2. For details, refer to descriptions in the foregoing method embodiment. To avoid repetition, detailed descriptions are appropriately omitted herein.

Therefore, in this embodiment of this application, the terminal device can learn, based on the indication information, whether the content of the system information is the same, and process system information with same content, thereby avoiding or alleviating a prior-art problem of repeated demodulation or unsatisfactory demodulation performance.

In addition, in this embodiment of this application, the terminal device may further perform combined demodulation on the at least two pieces of system information with same content. When received signal quality of a single piece of system information is relatively poor, received signal quality and system information transmission reliability can be improved by receiving and combining the at least two pieces of system information with same content, thereby avoiding or alleviating a prior-art problem of repeated demodulation or unsatisfactory demodulation performance.

In this embodiment of this application, the terminal device may demodulate only the first system information in the at least two pieces of system information, and when the first system information is correctly demodulated, skip demodulating other system information in the at least two pieces of system information. Therefore, in this embodiment of this application, to ensure that the system information is correctly demodulated, only the first system information needs to be demodulated, and the terminal device does not need to frequently and redundantly detect the system information that carries same content. Therefore, this embodiment of this application can avoid a prior-art problem of repeated demodulation or unsatisfactory demodulation performance, and can reduce power consumption of the terminal device, shorten information demodulation time, and improve system efficiency.

FIG. 6 is a schematic block diagram of a network device 600 according to an embodiment of this application. As shown in FIG. 6, the network device 600 includes:

a first sending unit 610, configured to send indication information to a terminal device, where the indication information includes information used to indicate content of N pieces of system information, and the indication information is used by the terminal device to determine at least two pieces of system information with same content in the N pieces of system information, and process the at least two pieces of system information; and a second sending unit 620, configured to send the N pieces of system information to the terminal device, where N is a positive integer greater than or equal to 2.

Therefore, in this embodiment of this application, the network device sends the indication information to the terminal, so that the terminal device can learn, based on the indication information, whether the content of the system information is the same, and process system information with same content, thereby avoiding or alleviating a prior-art problem of repeated demodulation or unsatisfactory demodulation performance.

Optionally, the indication information sent by the first sending unit 610 to the terminal device is used by the terminal device to perform combined demodulation on the at least two pieces of system information based on the indication information.

Alternatively, the indication information sent by the first sending unit 610 to the terminal device is used by the terminal device to demodulate first system information in the at least two pieces of system information based on the indication information, and skip demodulating system information other than the first system information in the at least two pieces of system information.

Optionally, the first sending unit is specifically configured to send a broadcast message to the terminal device, and the broadcast message carries the indication information.

Alternatively, the first sending unit is specifically configured to send control information to the terminal device, and the control information carries the indication information.

Optionally, the information used to indicate the content of the N pieces of system information includes at least one of the following:

a resource identifier corresponding to each of the N pieces of system information, a resource group identifier corresponding to each of the N pieces of system information, and a content identifier corresponding to each of the N pieces of system information.

Optionally, the at least two pieces of system information are in a same system information transmission period; or the at least two pieces of system information are in at least two system information transmission periods.

It should be understood that the network device 600 shown in FIG. 6 can implement processes related to the network device in the method embodiment in FIG. 2. Operations and/or functions of modules in the network device 600 are respectively used to implement corresponding procedures in the method embodiment in FIG. 2. For details, refer to descriptions in the foregoing method embodiment. To avoid repetition, detailed descriptions are appropriately omitted herein.

Therefore, in this embodiment of this application, the network device sends the indication information to the terminal, so that the terminal device can learn, based on the indication information, whether the content of the system information is the same, and process system information with same content, thereby avoiding or alleviating a prior-art problem of repeated demodulation or unsatisfactory demodulation performance.

In addition, in this embodiment of this application, the terminal device may further perform combined demodulation on the at least two pieces of system information with same content. When received signal quality of a single piece of system information is relatively poor, received signal quality and system information transmission reliability can be improved by receiving and combining the at least two pieces of system information with same content, thereby avoiding or alleviating a prior-art problem of repeated demodulation or unsatisfactory demodulation performance.

In this embodiment of this application, the terminal device may demodulate only the first system information in the at least two pieces of system information, and when the first system information is correctly demodulated, skip demodulating other system information in the at least two pieces of system information. Therefore, in this embodiment of this application, to ensure that the system information is correctly demodulated, only the first system information needs to be demodulated, and the terminal device does not need to frequently and redundantly detect the system information that carries same content. Therefore, this embodiment of this application can avoid a prior-art problem of repeated demodulation or unsatisfactory demodulation performance, and can reduce power consumption of the terminal device, shorten information demodulation time, and improve system efficiency.

FIG. 7 is a schematic block diagram of a terminal device 700 according to an embodiment of this application. As shown in FIG. 7, the terminal device 700 includes a processor 710 and a transceiver 720, and the processor 710 is connected to the transceiver 720. Optionally, the terminal device 700 further includes a memory 730, and the memory 730 is connected to the processor 710. Optionally, the device 700 further includes a bus system 740. The processor 710, the memory 730, and the transceiver 720 are connected by using the bus system 740. The memory 730 may be configured to store an instruction. The processor 710 is configured to perform the instruction stored in the memory 730, to control the transceiver 720 to receive information or a signal.

Specifically, the transceiver 720 is configured to receive indication information sent by a network device, where the indication information includes information used to indicate content of M pieces of system information.

The transceiver 720 is further configured to receive the M pieces of system information sent by the network device.

The processor 710 is configured to determine at least two pieces of system information with same content in the M pieces of system information based on the indication information, and process the at least two pieces of system information, where M is a positive integer greater than or equal to 2.

Therefore, in this embodiment of this application, the terminal device can learn, based on the indication information, whether the content of the system information is the same, and process system information with same content, thereby avoiding or alleviating a prior-art problem of repeated demodulation or unsatisfactory demodulation performance.

It should be understood that, in this embodiment of this application, the processor 710 may be a central processing unit (Central Processing Unit, "CPU" for short), or the processor 710 may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor, or the processor may be any conventional processor or the like.

The memory 730 may include a read-only memory and a random access memory, and provide an instruction and data to the processor 710. A part of the memory 730 may further include a non-volatile random access memory. For example, the memory 730 may further store device type information.

The bus system 740 may further include a power bus, a control bus, a status signal bus, and the like, in addition to a data bus. However, for clear description, various types of buses in the figure are marked as the bus system 740.

In an implementation process, steps in the foregoing method can be implemented by using a hardware integrated logical circuit in the processor 710, or by using instructions in a form of software. The steps of the method disclosed with reference to the embodiments of this application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, a register, or the like. The storage medium is located in the memory 730, and the processor 710 reads information in the memory 730 and completes the steps in the foregoing method in combination with hardware of the processor. To avoid repetition, details are not described herein again.

Optionally, the processor 710 is specifically configured to perform combined demodulation on the at least two pieces of system information.

Alternatively, the processor 710 is specifically configured to: demodulate first system information in the at least two pieces of system information, and skip demodulating system information other than the first system information in the at least two pieces of system information.

Optionally, the transceiver 720 is specifically configured to receive a broadcast message sent by the network device, where the broadcast message carries the indication information.

Alternatively, the transceiver 720 is specifically configured to receive control information sent by the network device, where the control information carries the indication information.

Optionally, the information used to indicate the content of the M pieces of system information includes at least one of the following:

a resource identifier corresponding to each of the M pieces of system information, a resource group identifier corresponding to each of the M pieces of system information, and a content identifier corresponding to each of the M pieces of system information.

Optionally, the at least two pieces of system information are in a same system information transmission period; or the at least two pieces of system information are in at least two system information transmission periods.

It should be understood that the terminal device 700 shown in FIG. 7 can implement processes related to the terminal device in the method embodiment in FIG. 2. Operations and/or functions of modules in the terminal device 700 are respectively used to implement corresponding procedures in the method embodiment in FIG. 2. For details, refer to descriptions in the foregoing method embodiment. To avoid repetition, detailed descriptions are appropriately omitted herein.

Therefore, in this embodiment of this application, the terminal device can learn, based on the indication information, whether the content of the system information is the same, and process system information with same content, thereby avoiding or alleviating a prior-art problem of repeated demodulation or unsatisfactory demodulation performance.

In addition, in this embodiment of this application, the terminal device may further perform combined demodulation on the at least two pieces of system information with same content. When received signal quality of a single piece of system information is relatively poor, received signal quality and system information transmission reliability can be improved by receiving and combining the at least two pieces of system information with same content, thereby avoiding or alleviating a prior-art problem of repeated demodulation or unsatisfactory demodulation performance.

In this embodiment of this application, the terminal device may demodulate only the first system information in the at least two pieces of system information, and when the first system information is correctly demodulated, skip demodulating other system information in the at least two pieces of system information. Therefore, in this embodiment of this application, to ensure that the system information is correctly demodulated, only the first system information needs to be demodulated, and the terminal device does not need to frequently and redundantly detect the system information that carries same content. Therefore, this embodiment of this application can avoid a prior-art problem of repeated demodulation or unsatisfactory demodulation performance, and can reduce power consumption of the terminal device, shorten information demodulation time, and improve system efficiency.

FIG. 8 is a schematic block diagram of a network device 800 according to an embodiment of this application. As shown in FIG. 8, the network device 800 includes a processor 810 and a transceiver 820, and the processor 810 is connected to the transceiver 820. Optionally, the network device 800 further includes a memory 830, and the memory 830 is connected to the processor 810. Optionally, the device 800 further includes a bus system 840. The processor 810, the memory 830, and the transceiver 820 are connected by using the bus system 840. The memory 830 may be configured to store an instruction. The processor 810 is configured to perform the instruction stored in the memory 830, to control the transceiver 820 to receive information or a signal.

The transceiver 820 is configured to: send indication information to a terminal device, where the indication information includes information used to indicate content of N pieces of system information, and the indication information is used by the terminal device to determine at least two pieces of system information with same content in the N pieces of system information, and process the at least two pieces of system information; and send the N pieces of system information to the terminal device, where N is a positive integer greater than or equal to 2.

Therefore, in this embodiment of this application, the network device sends the indication information to the terminal, so that the terminal device can learn, based on the indication information, whether the content of the system information is the same, and process system information with same content, thereby avoiding or alleviating a prior-art problem of repeated demodulation or unsatisfactory demodulation performance.

It should be understood that, in this embodiment of this application, the processor 810 may be a central processing unit (Central Processing Unit, "CPU" for short), or the processor 810 may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor, or the processor may be any conventional processor or the like.

The memory 830 may include a read-only memory and a random access memory, and provide an instruction and data to the processor 810. A part of the memory 830 may further include a non-volatile random access memory. For example, the memory 830 may further store device type information.

The bus system 840 may further include a power bus, a control bus, a status signal bus, and the like, in addition to a data bus. However, for clear description, various types of buses in the figure are marked as the bus system 840.

In an implementation process, steps in the foregoing method can be implemented by using a hardware integrated logical circuit in the processor 810, or by using instructions in a form of software. The steps of the method disclosed with reference to the embodiments of this application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, a register, or the like. The storage medium is located in the memory 830, and the processor 810 reads information in the memory 830 and completes the steps in the foregoing method in combination with hardware of the processor. To avoid repetition, details are not described herein again.

Optionally, the indication information sent by the transceiver 820 to the terminal device is used by the terminal device to perform combined demodulation on the at least two pieces of system information based on the indication information.

Alternatively, the indication information sent by the transceiver 820 to the terminal device is used by the terminal device to demodulate first system information in the at least two pieces of system information based on the indication information, and skip demodulating system information other than the first system information in the at least two pieces of system information.

Optionally, the transceiver 820 is specifically configured to send a broadcast message to the terminal device, and the broadcast message carries the indication information.

Alternatively, the transceiver 820 is specifically configured to send control information to the terminal device, where the control information carries the indication information.

Optionally, the information used to indicate the content of the N pieces of system information includes at least one of the following:

a resource identifier corresponding to each of the N pieces of system information, a resource group identifier corresponding to each of the N pieces of system information, and a content identifier corresponding to each of the N pieces of system information.

Optionally, the at least two pieces of system information are in a same system information transmission period; or the at least two pieces of system information are in at least two system information transmission periods.

It should be understood that the network device 800 shown in FIG. 8 can implement processes related to the network device in the method embodiment in FIG. 2. Operations and/or functions of modules in the network device 800 are respectively used to implement corresponding procedures in the method embodiment in FIG. 2. For details, refer to descriptions in the foregoing method embodiment. To avoid repetition, detailed descriptions are appropriately omitted herein.

Therefore, in this embodiment of this application, the network device sends the indication information to the terminal, so that the terminal device can learn, based on the indication information, whether the content of the system information is the same, and process system information with same content, thereby avoiding or alleviating a prior-art problem of repeated demodulation or unsatisfactory demodulation performance.

In addition, in this embodiment of this application, the terminal device may further perform combined demodulation on the at least two pieces of system information with same content. When received signal quality of a single piece of system information is relatively poor, received signal quality and system information transmission reliability can be improved by receiving and combining the at least two pieces of system information with same content, thereby avoiding or alleviating a prior-art problem of repeated demodulation or unsatisfactory demodulation performance.

In this embodiment of this application, the terminal device may demodulate only the first system information in the at least two pieces of system information, and when the first system information is correctly demodulated, skip demodulating other system information in the at least two pieces of system information. Therefore, in this embodiment of this application, to ensure that the system information is correctly demodulated, only the first system information needs to be demodulated, and the terminal device does not need to frequently and redundantly detect the system information that carries same content. Therefore, this embodiment of this application can avoid a prior-art problem of repeated demodulation or unsatisfactory demodulation performance, and can reduce power consumption of the terminal device, shorten information demodulation time, and improve system efficiency.

It should be understood that "an embodiment" or "an embodiment" mentioned in the whole specification means that particular features, structures, or characteristics related to the embodiment are included in at least one embodiment of this application. Therefore, "in an embodiment" or "in an embodiment" appearing throughout the specification does not refer to a same embodiment. In addition, these particular features, structures, or characteristics may be combined in one or more embodiments by using any appropriate manner. It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of this application, "B corresponding to A" indicates that B is associated with A, and B may be determined according to A. However, it should further be understood that determining B according to A does not mean that B is determined according to A only; that is, B may also be determined according to A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments in this application.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

With descriptions of the foregoing implementations, a person skilled in the art may clearly understand that this application may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or a disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk (Disk) and disc (disc) used by this application includes a compact disc CD, a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In summary, what is described above is merely example embodiments of the technical solutions of this application, but is not intended to limit the protection scope of this application. Any modification, equivalent replacement, or improvement made without departing from the spirit and principle of this application shall fall within the protection scope of this application.

What is claimed is:

1. An information transmission method, comprising:
receiving, by a terminal device, indication information from a network device, wherein the indication information comprises information indicating content of M pieces of system information, and M is a positive integer greater than or equal to 2;
receiving, by the terminal device, the M pieces of system information from the network device;
determining, by the terminal device, at least two pieces of system information with same content in the M pieces of system information based on the indication information;
demodulating, by the terminal device, first system information in the at least two pieces of system information; and
skipping demodulating system information other than the first system information in the at least two pieces of system information.

2. The method according to claim 1, wherein the receiving, by a terminal device, indication information from a network device comprises:
receiving, by the terminal device, a broadcast message from the network device, wherein the broadcast message carries the indication information.

3. The method according to claim 1, wherein the receiving, by a terminal device, indication information from a network device comprises:
receiving, by the terminal device, control information from the network device, wherein the control information carries the indication information.

4. The method according to claim 1, wherein
the information indicating the content of the M pieces of system information comprises at least one of the following:
a resource identifier corresponding to each of the M pieces of system information, a resource group identifier corresponding to each of the M pieces of system information, or a content identifier corresponding to each of the M pieces of system information.

5. The method according to claim 1, wherein
the at least two pieces of system information are in a same system information transmission period; or
the at least two pieces of system information are in at least two system information transmission periods.

6. An apparatus, comprising:
a receiver, configured to:
receive indication information from a network device, wherein the indication information comprises information indicating content of M pieces of system information, and M is a positive integer greater than or equal to 2; and
receive the M pieces of system information from the network device; and
one or more processors, configured to:
determine at least two pieces of system information with same content in the M pieces of system information based on the indication information;
demodulate first system information in the at least two pieces of system information; and
skip demodulating system information other than the first system information in the at least two pieces of system information.

7. The apparatus according to claim 6, wherein
the receiver is configured to receive a broadcast message from the network device, wherein the broadcast message carries the indication information.

8. The apparatus according to claim 6, wherein
the receiver is configured to receive control information from the network device, and the control information carries the indication information.

9. The apparatus according to claim 6, wherein
the information indicating the content of the M pieces of system information comprises at least one of the following:
a resource identifier corresponding to each of the M pieces of system information, a resource group identifier corresponding to each of the M pieces of system information, or a content identifier corresponding to each of the M pieces of system information.

10. The apparatus according to claim 6, wherein
the at least two pieces of system information are in a same system information transmission period; or
the at least two pieces of system information are in at least two system information transmission periods.

11. A non-transitory computer-readable storage medium storing computer instructions, that when executed by one or more hardware processors, cause the one or more hardware processors to perform operations comprising:
receiving, by a terminal device, indication information from a network device, wherein the indication information comprises information indicating content of M pieces of system information, and M is a positive integer greater than or equal to 2;
receiving, by the terminal device, the M pieces of system information from the network device;
determining, by the terminal device, at least two pieces of system information with same content in the M pieces of system information based on the indication information;
demodulating, by the terminal device, first system information in the at least two pieces of system information; and
skipping demodulating system information other than the first system information in the at least two pieces of system information.

12. The non-transitory computer-readable storage medium according to claim 11, wherein the receiving, by a terminal device, indication information from a network device comprises:
receiving, by the terminal device, a broadcast message from the network device, wherein the broadcast message carries the indication information.

13. The non-transitory computer-readable storage medium according to claim 11, wherein the receiving, by a terminal device, indication information from a network device comprises:
   receiving, by the terminal device, control information from the network device, wherein the control information carries the indication information.

14. The non-transitory computer-readable storage medium according to claim 11, wherein the information indicating the content of the M pieces of system information comprises at least one of the following:
   a resource identifier corresponding to each of the M pieces of system information, a resource group identifier corresponding to each of the M pieces of system information, or a content identifier corresponding to each of the M pieces of system information.

15. The non-transitory computer-readable storage medium according to claim 11, wherein the at least two pieces of system information are in a same system information transmission period.

16. The non-transitory computer-readable storage medium according to claim 11, wherein the at least two pieces of system information are in at least two system information transmission periods.

\* \* \* \* \*